United States Patent [19]

Simmons

[11] 4,010,608
[45] Mar. 8, 1977

[54] SPLIT FAN WORK GAS TURBINE ENGINE

[75] Inventor: John Robert Simmons, Cincinnati, Ohio

[73] Assignee: General Electric Company, Lynn, Mass.

[22] Filed: June 16, 1975

[21] Appl. No.: 587,135

[52] U.S. Cl. .............................. 60/226 R; 60/262; 60/242; 60/261

[51] Int. Cl.² ........................................ F02K 3/04

[58] Field of Search .............. 60/262, 226 R, 39.29, 60/233, 242, 261

[56] References Cited

UNITED STATES PATENTS

| | | | |
|---|---|---|---|
| 2,831,627 | 4/1958 | Brunner | 60/39.29 UX |
| 3,296,800 | 1/1967 | Keenan | 60/262 X |
| 3,368,352 | 2/1968 | Hewson | 60/262 X |
| 3,688,504 | 9/1972 | Hutchinson | 60/39.29 X |
| 3,886,737 | 6/1975 | Grieb | 60/226 R |

Primary Examiner—Clarence R. Gordon
Attorney, Agent, or Firm—James W. Johnson, Jr.; Derek P. Lawrence

[57] ABSTRACT

One or more of the aft stages of the fan section of a gas turbine engine are rotated by the high pressure turbine of a gas generator and the remainder of the fan stages are rotated by a low pressure turbine downstream of the gas generator. This arrangement divides the fan work between the low and high pressure turbines to permit more efficient utilization of the total available turbine capacity, reduction in low pressure turbine workload, increased aft fan stage pressure ratio capability and greater flow and pressure ratio modulation potential for a split fan engine. The invention has a wide range of application for various turbofan configurations including separated and/or mixed flow turbofan engines with separated or close coupled fan sections.

3 Claims, 5 Drawing Figures

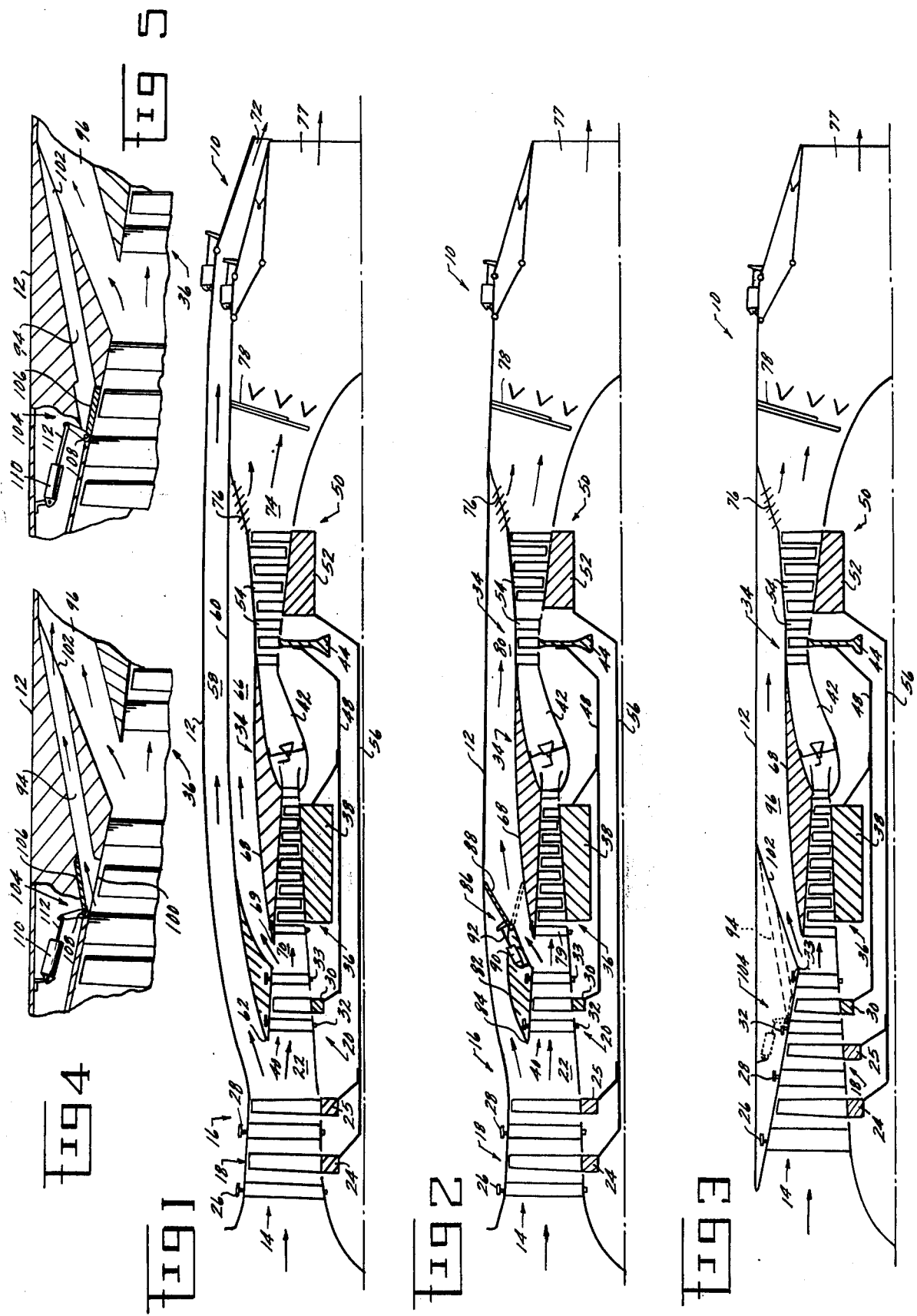

SPLIT FAN WORK GAS TURBINE ENGINE

BACKGROUND OF THE INVENTION

This invention relates to a gas turbofan engine and, more particularly, to a novel arrangement for the fan section thereof.

Considerable attention has been devoted to developing gas turbine engines with the high specific thrust characteristics of a turbojet or low bypass turbofan at supersonic speeds which can also be configured to exhibit the lower specific thrust, low noise, and low fuel consumption characteristics of a higher bypass turbofan at subsonic speeds in order that a very efficient mixed-mission aircraft may be developed. Such engines are generally referred to as variable cycle engines.

Several design approaches for a variable cycle engine have been proposed including several modifications of mixed flow gas turbine engines. Thus, it has been proposed to vary the bypass ratio of a gas turbine engine by operating it either as a mixed flow or a separated flow turbofan by selectively mixing or separating the bypass duct stream from the core exhaust stream using diverter valves. It has also been proposed to increase the flow modulation potential of a gas turbine engine by splitting the fan into two sections, each in flow communication with a separate concentric bypass duct.

One problem associated with all such prior art variable cycle engines is the high workload imposed on the fan system to produce the desired high bypass ratios at low thrust flight. In order to supply sufficient rotational energy to produce these high fan flow rates, most prior art turbofan engines have utilized a multi-stage low pressure turbine disposed downstream of the high pressure turbine of a gas generator which operates at relatively high temperatures.

SUMMARY OF THE INVENTION

It is, therefore, a primary object of the present invention to provide an improved gas turbine engine capable of operating over a wider range of thrust levels and bypass ratios with reduced low pressure turbine size and lower operating temperatures.

It is also an object of this invention to provide a gas turbine engine in which the fan workload is shared by the high pressure turbine of the gas generator and a low pressure turbine disposed downstream of the gas generator.

These and other objects of the invention have been achieved in the preferred embodiments of the invention wherein one or more of the aft stages of the multi-stage fan section of a gas turbofan engine are rotated by the high pressure turbine of the gas generator and the remainder of the fan stages are rotated by a low pressure turbine downstream of the gas generator. This arrangement divides the fan workload between the low and high pressure turbines to permit more efficient utilization of the total available turbine capacity and a reduction in low pressure turbine workload. Further, by directly coupling the aft fan stages to the high pressure turbine rotor, the aft fan stages may be operated at increased rotational speeds to provide a greater pressure rise across the aft fan stages. The reduction of low pressure turbine workload reduces the energy extraction potential required of the low pressure turbine and resultant turbine cooling requirements for the gas turbine engine of this invention, and further permits the gas turbine engine of this invention to achieve a higher bypass ratio for a given low pressure turbine energy extraction potential than is characteristic of prior art gas turbine engines in which the fan section is coupled only to the low pressure turbine system.

The invention has a wide range of application for various engine configurations and thus may be utilized in a split fan multiple bypass duct gas turbine engine, or in a single bypass mixed flow gas turbine engine with a split or close coupled fan sections. The invention significantly increases the flow modulation potential of a split fan variable cycle engine. Because the aft fan section is driven by the high pressure turbine, it may be operated at higher or lower rotational velocities than the front fan section which is driven by the low pressure turbine thereby permitting increased flexibility in dividing the engine airflow between the bypass ducts and gas generator and enabling a higher or lower pressure rise to be achieved across the aft fan section.

For the close coupled fan mixed flow engines, it may also be desirable to include an inter-fan bleed system between the low pressure turbine driven front fan stages and the high pressure turbine driven aft fan stages, in order to bleed off excess front fan flow during low thrust flight.

The invention may also be utilized in combination with a downstream diverter valve, or a variable area mixer. These latter devices, when utilized with the invention, provider a variable cycle gas turbine engine having a high degree of flow modulation potential which may be operated efficiently through a broad range of engine thrust settings and bypass ratios.

BRIEF DESCRIPTION OF THE DRAWINGS

The invention may be better understood upon reading the following description of the preferred embodiments in conjunction with the accompanying drawings wherein:

FIG. 1 is a cross-sectional view of a split fan double bypass gas turbine engine incorporating this invention.

FIG. 2 is a cross-sectional view of a split fan mixed flow gas turbine engine incorporating this invention.

FIG. 3 is a cross-sectional view of a close coupled fan mixed flow gas turbine engine incorporating this invention.

FIG. 4 is a fragmented view of a portion of the gas turbine engine of FIG. 3 is one mode of operation.

FIG. 5 is a fragmented view of a portion of the gas turbine engine of FIG. 3 in a different mode of operation.

DESCRIPTION OF THE PREFERRED EMBODIMENT

Referring to FIG. 1, there is shown a gas turbine engine 10 having an outer casing or nacelle 12, the upstream end of which forms an inlet 14 sized to provide a predetermined design airflow to the engine 10. Disposed in the inlet 14 is a fan shown generally at 16 for receiving and compressing the airflow delivered to the inlet 14. The fan 16 includes a front section 18 axially displaced from an aft fan section 20 by an axial space designated generally at 22. This arrangement is similar to the disclosed in U.S. patent application, Ser. No. 445,438 filed by Bernard L. Koff et al on Feb. 25, 1974, now abandoned, and assigned to the same assignee at this invention. Front fan section 18 includes a plurality of rotor blades 24 and 25, interspaced between variable inlet guide vane 26 and variable stator vane 28. Similarly, the aft fan section 20 includes a rotor 30 and interspaced between aft fan variable stator vanes 32 and 33.

Downstream of the fan 16 there is provided a gas generator shown generally at 34. The gas generator includes a compressor 36 having a rotor 38. Pressurized air entering the compressor 36 through a flow annulus 40 is compressed and then discharged to a combustor 42 where fuel is burned to provide high energy combustion gases which drive a high pressure turbine rotor 44. The high pressure turbine rotor 44 operates to extract energy from the high pressure gas stream exiting the combustor 42, and to convert some of this energy into shaft horsepower for driving the rotor stages 38 of the compressor 36 through an upstream extending driveshaft 48 connected for rotation with rotors 38 and 44.

Disposed downstream of the high pressure turbine rotor 44, in a position to receive the flow of hot gases leaving the gas generator 34, is a low pressure turbine shown generally at 50. The low pressure turbine 50 includes a rotor section 52 having a plurality of rotor blades interspaced between stator blades 54. The low pressure turbine 50 converts energy from the high pressure gases exiting the high pressure turbine into shaft horsepower and delivers this power to the rotors 24 and 25 of the front fan section 18 through an upstream extending driveshaft 56. In accordance with one aspect of this invention, the shaft 48 driven by the high pressure turbine rotor 44 is extended upstream of the gas generator compressor rotor 38 and interconnected with the rotor 30 so as to supply rotational energy to the spool 30 of the aft fan section 20.

In order to bypass a portion of the fan airflow around the core engine, there are provided two concentric bypass ducts. An outer duct, shown generally at 58, is provided between the engine outer casing 12 and a intermediate casing 60. The upstream end 62 of the intermediate casing 60 terminates in the annular space 22 between the front and aft fan sections such that air entering the engine inlet 14 and compressed by the front fan section 18 is thereafter divided between the outer bypass duct 58 and the aft fan section 20. The inner bypass duct shown generally at 66 is formed between the intermediate casing 60 and the engine inner casing 68 circumscribing gas generator 34 and low pressure turbine 50. The upstream end 69 of the inner casing 68 terminates in the axial space 70 separating the aft section 20 and gas generator 34 such that airflow compressed by and exiting from the aft fan section 20 is divided between the inner bypass duct 66 and the gas generator 34.

In order to deliver propulsive force to the engine, a variable area outer exhaust nozzle shown generally at 72 is provided to exhaust the flow in the outer bypass duct 58 to the ambient. The flow to the inner bypass duct 66 is mixed with the gas generator flow exiting the low pressure turbine 50 in the region shown generally at 74 downstream of the low pressure turbine 50. For this purpose, a suitable mixer shown generally at 76 is provided at the downstream end of the inner bypass duct 66 and upstream of outer bypass exhaust nozzle 72. The mixer 76 is preferably of the variable area type as disclosed in U.S. application, Ser. No. 583,055 filed by J. Rundell et al on June 2, 1975. To further increase thrust at high mach numbers, an after burner shown generally at 78 may be provided downstream of the mixer 76. The intermixed flows from the gas generator 34 and inner bypass duct 66 are exhausted from a suitable variable area convergent divergent exhaust nozzle 77 formed at the downstream end of the intermediate nacelle 60 and circumscribed by the outer exhaust nozzle 72.

Prior art mixed flow engines have not operated efficiently throughout a variable thrust range because they experience significantly high inlet drag levels during low thrust flight. Typically, the inlet of a gas turbine engine is sized to be full at the maximum thrust of the engine. However, as engine thrust is decreased below the maximum thrust, the engine airflow demand is considerably less than the total airflow supplied to the inlet. This excess airflow to the inlet causes inlet spillage drag which has significantly increased the installed fuel consumption of prior art mixed flow engines. The flow variability afforded by this invention permits the airflow to the engine inlet 14 to be maintained at a matched design level throughout a wide range of engine thrust levels, thereby avoiding the inlet spillage drag associated with the prior art mixed flow engines and significantly increasing installed fuel consumption.

The variable cycle engine of FIG. 1 has a high degree of flow modulation. The position of the inlet to the outer bypass duct 58 and the inlet to the aft fan section 20 downstream of the front fan section 18 and the position of the inlet to the inner bypass duct 66 and the inlet to the gas generator 34 downstream of the aft fan section combine with variable inlet guide vanes and variable stator sections of the front and aft fan sections to permit the total inlet airflow to be divided between the outer bypass duct 58, the inner bypass duct 66, and the gas generator 34 in varying proportions so that engine bypass ratio may be varied over a wide range while maintaining the total engine inlet airflow at the matched design level. More particularly, increasing the proportion of total inlet airflow which is directed to the outer and inner bypass ducts 58 and 66 respectively, while reducing flow through the gas generator 34, results in a higher engine bypass ratio. Similarly, decreasing the proportion of total inlet airflow to the bypass ducts 58 and 66, while increasing the air-flow to the gas generator 34, results in a lower bypass ratio.

By driving the aft fan rotor 30 with the high pressure turbine 44, the total workload of the fan 16 is divided between the high pressure turbine 44 and the low pressure turbine 50. This arrangement has particular utility in the low thrust high bypass flow mode of engine operation. In such conditions, the bypass ratio is increased by bypassing a greater amount of the total inlet airflow around the gas generator through the outer bypass duct 58 and the inner bypass duct 66. This is generally accomplished by adjusting the variable inlet guide vanes and stator sections of the front and aft fan sections to maximize the flow therethrough, and by adjusting the gas generator speed and variable inlet guide vane 79 to minimize the flow to the gas generator. In this mode, the pressure rise in the front fan section 18 and aft fan section 20 requires a relatively large amount of energy to be extracted from the turbines supplying rotational energy to these fan sections. However, since the gas generator flow is significantly reduced for this low thrust high bypass mode of operation, the energy required to drive the compressor 36 of the gas generator is less than that which is required in high thrust conditions. Thus, there is an excess of energy extraction potential in the high pressure turbine. This excess high pressure turbine capacity is utilized to drive the aft fan section 20 in order to reduce the workload required of the low pressure turbine 52. The resultant reduction in energy extraction potential required of the low pressure turbine permits the low pressure turbine to operate at lower pressure ratios, thereby reducing the low pressure turbine work requirements and/or permitting utilization of a fewer number of low pressure turbine stages with resultant savings in cost, weight, and cooling flow. Thus, while low pressure turbine rotor 52 has been illustrated as comprising three stages, it may be possible for some applications to utilize a single stage for the rotor 52.

The engine of this invention also has greater flow flexibility than prior art gas turbine engines of the split fan configuration. Because the aft fan section is directly coupled to the high pressure turbine, it may be operated at different and higher rotational velocities than those fan sections which are coupled to the low pressure turbine, thereby permitting increased flexibility in dividing the inlet airflow between the outer and inner bypass ducts and the gas generator and enabling a higher pressure rise to be achieved across the aft fan section 20.

In the high thust low bypass mode of engine operation, the variable inlet guide vanes and stators of the front and aft fan sections are adjusted to reduce the flow in the inner and outer bypass ducts and increase the flow to the gas generator 34. Even though the energy extraction requirements for the high pressure turbine are increased during such flight conditions, the total energy extraction potential of the high pressure turbine is not exceeded. This is due in part to the increased booster airflow from the aft fan section 20 to the gas generator 34 and the increased pressure rise across the aft fan section 20 resulting from the higher rotational velocities of the high pressure turbine in this mode of operation.

Referring to FIG. 2, wherein like numbers refer to previously identified components, therein is shown another embodiment for a gas turbine engine incorporating this invention. The engine of this embodiment utilizes a single bypass duct 80 in lieu of the dual bypass duct arrangement of FIG. 1. This arrangement is similar to that disclosed in copending U.S. application, Ser. No. 587,134 filed by J. Simmons on June 16, 1975. The fan 16 of this embodiment is divided into a front and aft fan section 18 and 20 respectively as in the embodiment of FIG. 1. An annular casing 82 is provided intermediate the outer engine nacelle 12 and the inner engine casing 68. The intermediate casing 82 has its upstream end 84 disposed in the axial space 22 between the front and aft fan sections and has its downstream end terminating approximately coplanar with the inlet 40 to the gas generator compressor 36. An annular diverter valve shown generally at 86 is secured to the downstream end of the intermediate casing 82 to provide a means to modulate the bypass duct flow. The diverter valve comprises an annular hinged flap 88 pivotally mounted to the downstream end of the intermediate casing 82 and extending downstream into the bypass duct 80. Suitable actuator means which may comprise a linear actuator 90 having a control arm 92 in driving engagement with the annular hinged flap 88 is provided to rotate the flap 88 about the downstream end of the intermediate casing 82. The diverter valve 86 may be moved between an open position as shown in FIG. 2 wherein the downstream end of the flap 88 abuts the inner wall of the engine outer casing 12 to a closed position as illustrated in phantom in FIG. 2, wherein the downstream end of the flap 88 abuts the outer wall of the engine inner casing 68 including all positions intermediate the fully opened and fully closed positions. In its fully open position, as illustrated in FIG. 2, the diverter valve 86 obtrudes the bypass duct as a point upstream of the aft fan section 20 such that the total airflow exhausted from the front fan section 18 is directed to the aft fan section 20. Thereafter, the air compressed by both fan sections is divided between the bypass duct 80 and the gas generator 34. In its fully closed position as illustrated in phantom in FIG. 2, the diverter valve 86 obtrudes flow from the aft fan section 20 to the inner bypass duct 80 such that the flow exiting the front fan section 18 is divided between the bypass duct 80 and the aft fan section 20, and the total flow exhausted from the aft fan section 20 is directed to the gas generator 34. This arrangement permits the pressure level of the inner bypass duct flow to be controlled directly as a function of the rotational position of the diverter valve 86 and thereby permits a high degree of flow moldulation without the use of a double bypass duct arrangement as in the embodiment of FIG. 1.

In the embodiment of FIG. 2, like the embodiment of FIG. 1, the aft fan spool 30 is coupled directly to the high pressure turbine 44 through driveshaft 48. The increased flow modulation resulting from the diverter valve 86 and the separate control of rotational speeds of the aft fan section 20 due to its connection to the high pressure turbine 44 permits the gas turbo-fan engine of FIG. 2 to operate over a wide range of engine bypass ratios and thrust levels with the total inlet airflow maintained at a matched design level throughout.

The fan configuration of this invention also has applicability to gas turbine engines in which the fan sections are closely coupled rather than split. Referring to FIGS. 3, 4 and 5 where like numbers refer to previously identified components, therein is shown still another embodiment of a gas turbine engine incorporating this invention wherein the front and aft fan sections 18 and 20 respectively are closely coupled rather than separated by an axial spaced as in the embodiments of FIGS. 1 and 2. The advantages resulting from sharing the low pressure turbine workload by connecting one or more of the aft rotor blades of the fan permit efficiency in the design of the low pressure turbine system for this embodiment as in the embodiments of FIGS. 1 and 2. The enable the front fan airflow to be matched to the aft fan airflow throughout widely varying bypass ratios and thrust levels, a conduit 94 may be provided intermediate the front and aft fan sections so that excess front fan section airflow may be bled around the aft fan section 20 to the bypass duct 96. The conduit 94 has its inlet 100 disposed intermediate the front end aft fan sections 18 and 20 respectively and its outlet 102 in flow communication with the bypass duct 96 at a point downstream of the inlets to the aft fan section 20 and gas generator 34. A suitable valve, shown generally at 104, is provided at the inlet 100 to the conduit 94. The valve 104, as best seen in FIGS. 4 and 5, comprises a hinged flap 106 pivotally hinged at 108 to the upstream end of the conduit 94. A suitable actuator 110 having a control arm 112 in driving engagement with the flap 106 is provided to rotate the flap 106 about the downstream end of the conduit 94. The flap 106 is of suitable cross-section such that it may be moved to a fully closed position as illustrated in FIG. 5 wherein flow in the conduit 94 is obtruded to a fully open position as illustrated in FIG. 4 allowing a maximum low through the conduit 94, as well as all position intermediate the fully closed and fully open positions. Thus, the amount of flow bled around the aft fan section will be determined by the position of the valve 104 such that under those flight conditions in which the total airflow exiting the front fan section 18 is in excess of that required by the aft fan section 20, the excess can be bled to the bypass duct 96 while maintaining the engine inlet airflow matched to the optimum design level. The actuator 110 which controls the flap 106 may be part of any suitable inlet guide vane control system of the type well known in the art capable of controlling the rotational position of the valve 104 as a function of gas generator speed. One such control system suitable for this purpose is disclosed in U.S. Pat. No. 2,931,168.

Various changes could be made in the embodiments shown in FIGS. 1 through 4 without departing from the scope of this invention. Thus, while single and double bypass embodiments have been illustrated, further flow variability could be achieved by increasing the number of fan stages and bypass duct in flow communication therewith. In addition, exhaust nozzle systems other than those illustrated may be utilized to increase the flow modulation potential. For example, the embodiment of FIG. 1 might be modified by providing the outer exhaust nozzle 72 with a convergent divergent section and extending the outer bypass nozzle 72 downstream of the inner exhaust nozzle 77 such that the gases exhausted from the outer bypass duct and the combined flows then exhausted from the common variable area converging diverging nozzle assembly. A configuration of this type is disclosed in U.S. patent application, Ser. No. 583,056, filed by Johnson et al on June 2, 1975. Further, the variable area mixer 76 may be replaced with an aft end diverter valve as disclosed in the aforementioned Johnson et al application.

For simplicity in design, the number of variable geometry components illustrated in the above embodiments have been kept to the minimum necessary to achieve a desired degree of flow variability; however, it is also possible to utilize other variable geometry components to provide a greater degree of flow modulation. Thus, the compressor, low pressure turbine, and high pressure turbines may be equipped with additional variable stator blades or variable rotor blades, or a variable nozzle diaphragm may be provided intermediate the high pressure and low pressure tubines to achieve additional flexibility in flow modulation without departing from the scope of this invention.

Therefore, having described preferred embodiments of the invention, though not exhaustive of all possible equivalents, what is desired to be secured by letters patent of the U.S. is claimed below.

What is claimed is:

1. In a gas turbine engine having a compressor, combustor, high pressure turbine supplying rotational energy to the compressor and low pressure turbine in serial flow relation, all being circumscribed by an inner engine casing and an outer nacelle spaced apart from the inner engine casing to define a bypass duct therebetween, the outer nacelle extending upstream of the inner engine casing to define an inlet for the engine and downstream of the inner engine casing to define an exhaust system for the engine, there is provided:
   a front fan section disposed in the inlet upstream of the inner engine casing and receiving rotational energy from the low pressure turbine,
   an aft fan section disposed intermediate the front fan section and compressor, receiving rotational energy from the high pressure turbine and circumscribed by an intermediate casing which is spaced radially inward from the outer nacelle to define a bypass duct around the aft fan section, and
   diverter valve means secured to the aft end of the intermediate casing for selectively distributing the flow compressed by the front fan section between the aft fan section and the bypass duct around the aft fan section and simultaneously therewith selectively distributing the flow compressed by the aft section between the compressor and bypass duct around the compressor.

2. The gas turbine engine of claim 1 wherein the diverter valve means is movable between a first position in which the total gas flow exiting the front fan section is directed to the aft section and the gas flow exiting the aft fan section is divided between the compressor and the bypass duct around the compressor and a second position in which the gas flow exiting the front fan section is divided between the aft fan section and the bypass duct around the aft fan section and the total gas flow exiting the aft fan section is directed to the compressor.

3. The gas turbine engine of claim 2 wherein the diverter valve means comprises:
   a flap rotatably hinged to the downstream end of the intermediate nacelle, and
   a linear actuator for rotating the flap about the aft end of the intermediate nacelle.

* * * * *